(12) United States Patent
Shih (10) Patent No.: US 6,951,472 B2
(45) Date of Patent: Oct. 4, 2005

(54) LIFT-COVER MEMORY CARD CONNECTOR

(75) Inventor: Hsien-Kuang Shih, Taoyuan (TW)

(73) Assignee: P-Two Industries Inc., Taoyuan (TW)

( * ) Notice: Subject to any disclaimer, the term of this patent is extended or adjusted under 35 U.S.C. 154(b) by 36 days.

(21) Appl. No.: 10/885,795

(22) Filed: Jul. 8, 2004

(65) Prior Publication Data

US 2005/0106920 A1    May 19, 2005

(30) Foreign Application Priority Data

Nov. 17, 2003    (TW) .............................. 92132198 A (51) Int. Cl.⁷ ........................................... H01R 13/62
(52) U.S. Cl. ...................... 439/326; 439/165; 439/630; 439/138; 439/945
(58) Field of Search ........................ 439/165, 136–138, 439/630–632, 326, 945

(56) References Cited

U.S. PATENT DOCUMENTS

| | | | |
|---|---|---|---|
| 5,813,878 A | * | 9/1998 | Kuwata et al. ............. 439/326 |
| 6,241,545 B1 | * | 6/2001 | Bricaud et al. ............. 439/326 |
| 6,623,304 B2 | * | 9/2003 | Harasawa et al. .......... 439/630 |

* cited by examiner

Primary Examiner—Truc Nguyen (57) ABSTRACT

A lift-cover mini Secure Digital (SD) card connector includes an insulation body, a movable cover and eleven insertion terminals. The movable cover has a drawer space for allowing a mini SD card to be inserted at any desired angle; and, apart from lifting and closing movements, is capable of linear back-and-forth movements with a small distance when closed. When the movable cover is retained by the insulation body, a signal contact portion of the mini SD card forms electric connection with the insertion terminals at the insulation body.

9 Claims, 8 Drawing Sheets

LIFT-COVER MEMORY CARD CONNECTOR

BACKGROUND OF THE INVENTION (a) Field of the Invention

The invention relates to a lift-cover memory card connector, and more particularly, to a connector tailored for mini Secure Digital (SD) cards.

(b) Description of the Prior Art

Figure 1:
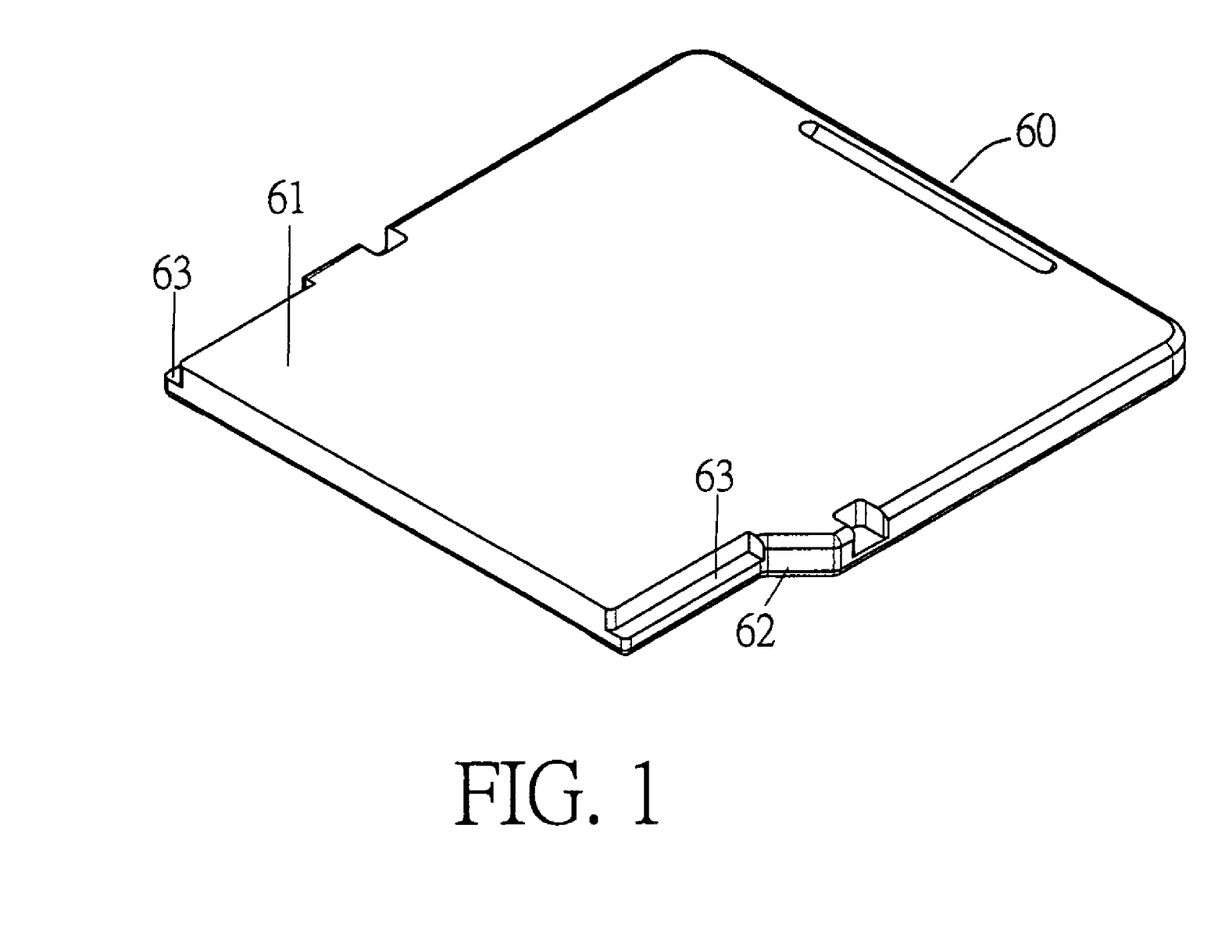
FIG. 1 shows a structural view of the new-type mini SD card 60.

Referring to FIG. 1, a flash memory card, also known as new type a mini Secure Digital (SD) card 60, has dimensions of 20 mm×21.5 mm×1.4 mm, an area of approximately a half of that of a thumb, and a storage capacity of 256 megabytes (MB). The aforesaid device comprises eleven signal lines at a signal contact portion 61 at a lower surface thereof, a guiding track portion 63 formed at each two sides of the signal contact portion 61, and a protective structure formed by a wedge-shaped plane 62 having a notch. Thus, compared to a standard SD card having nine signal lines and dimensions of 32 mm×24 mm×2.1 mm, a mini SD card is much smaller, and can save up to more than 40% with respect to an area required for printed circuit board (PCB) and even up to more than 60% with respect to a volume required when being applied to portable devices. Also, the two additional signal lines are reserved for future expansions; for example, antenna connection for short-distance wireless communications with non-contact integrated circuits.

Being capable of saving significant area and volume required owing to a small size and a light volume, this type of mini SD card 60 is adapted and suitable for applications and researches of handheld electronic devices such as mobile phones that need mass data storage. Furthermore, SD interfaces used by current mobile phones are the same as SD interfaces used by the SD cards, and compatibility for both hardware and software is offered. Therefore, the U.S Secure Digital Association has already recognized standard specifications of mini SD flash cards to the public, and established standard specifications of mini SD flash cards as future extensions of current SD cards.

When adopting the mini SD card 60 for data storage, new-type mobile phones are allowed with expanded memory storage for providing multimedia functions including digital static camera (DSC), video capturing, MP3 player, computer games, personal information management (PIM), email and voice-mail, and internet communications. Above all, the mini SD cards come in small sizes and light weights that conform to requirements as mobile phones also need to be small in size and light in volume according to market trends.

In view of the above, to make agreeable to future extensive applications of the mini SD card 60, the invention proposes a connector devised according to specifications of the mini SD card 60 and tailored especially for the mini SD card 60.

SUMMARY OF THE INVENTION

The primary object of the invention is to provide a lift-cover mini Secure Digital (SD) car connector especially tailor for mini SD cards, which can thereby be extensively applied to multimedia mobile phones, digital static cameras (DSC), digital video cameras, MP3 players, recorders and global positioning systems, with the mini SD card utilized for data storage. More particularly, the SD card using the SD card connector according to the invention can be applied to mobile phones for offering the mobile phones with functions of DSC and internet communication.

The secondary object of the invention is to provide a lift-cover mini SD card connector comprising an insulation body, a movable cover and eleven insertion terminals. The movable cover has a drawer space for allowing the mini SD card to be inserted at any desired angle to substantially reducing operation space of the mini SD card. Apart from lifting and closing movements, the movable cover is also capable of linear back-and-forth movements with a small distance. When the movable cover is retained by the insulation body, a signal contact portion of the mini SD card forms good electric connection with the insertion terminals at the connector.

The other object of the invention is to provide a lift-cover mini SD card connector, wherein a movable cover thereof has two sides formed as unsymmetrical structures according to standard specifications of a mini SD card, thereby appropriately placing a signal contact portion of the mini SD card in correction directions. Meanwhile, when the mini SD card is inserted into a drawer space of the movable cover, the movable cover is located across above guiding track portions at two sides of the signal contact portion of the mini SD card, thereby guiding the mini SD card to be accurately placed into the movable cover.

DETAILED DESCRIPTION OF THE PREFERRED EMBODIMENTS

Referring to FIGS. 2 to 5, a mini Secure Digital (SD) card connector 10 according to the invention at least comprises an insulation body 20, a movable cover 30 having functions of a drawer and for accommodating a mini SD card 60, and eleven insertion terminals 40.

Figure 3:
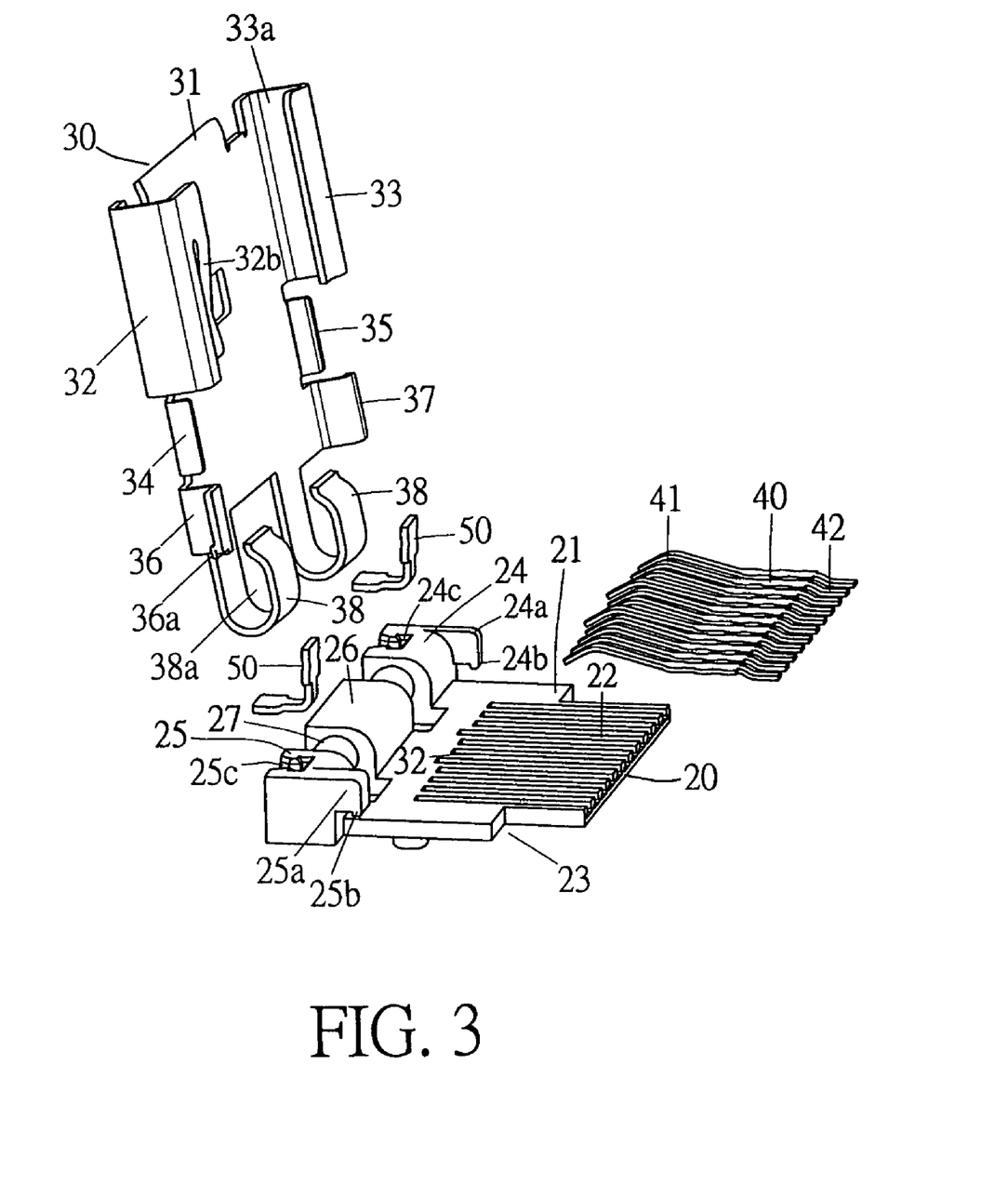
FIG. 3 shows an exploded view illustrating various parts of the mini SD card connector 10 according to the invention.

The insulation body 20 has a flat base 21 extended forward. As shown in FIG. 3, a flatbed of the base 21 has eleven channels 22 for insetting the eleven insertion terminals 40. A front portion of each two sides of the flatbed of the base 21 is formed with an indenture 23. The provision of the indentures 23 is that, referring to FIGS. 7 and 8, when the movable cover 30 is covered, inverted L-shaped left and right folded panels 33 and 32 having functions of a drawer and located at left and right sides of the movable cover 30 are not collided into the flatbed of the base 21 of the insulation body 20, and are enabled to move back-and-forth within a space defined by the indentures 23 of the base 21. To be more precise, the movable cover 30 is can be pushed forward or drawn backward as directions indicated in the figures.

Figure 2:
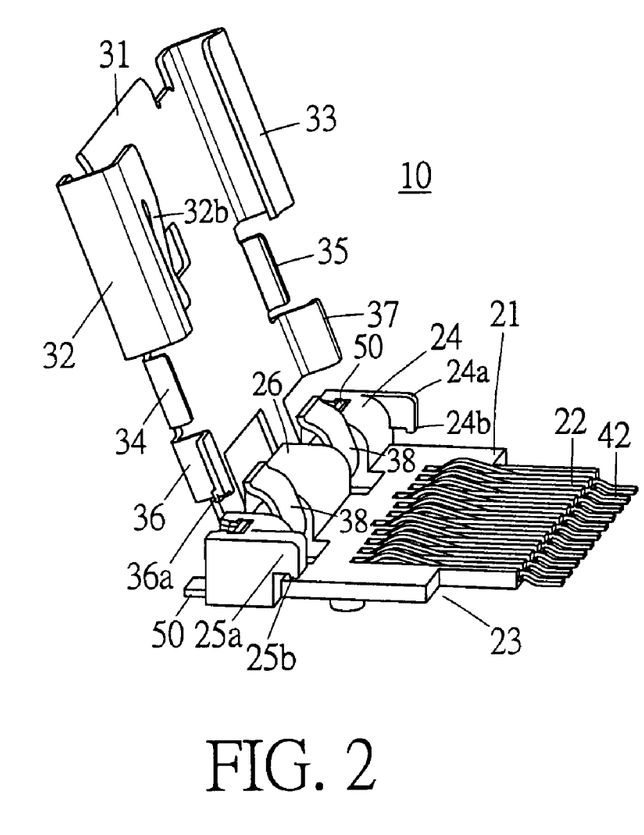
FIG. 2 shows a schematic view illustrating the mini SD card connector 10 having a movable cover 30 thereof being lifted for use according to the invention.

When the eleven insertion terminals 40 are together located at the flatbed of the base 21 of the insulation body 20, a bent front section 41 of each insertion terminal 40 is protruded out of the flatbed of the base 21 and is allowed with elasticity. A rear connecting section 42 of each insertion terminal 40 is exposed at an exterior as shown in FIG. 2, and can be soldered to a printed circuit board (PCB) when applied to the mini SD card connector 10 according to the invention. When the movable cover 30 is placed with the mini SD card 60 and covered together, good electric connection is formed between the eleven signal lines at the signal contact portion 61 of the mini SD card 60 and the eleven insertion terminals 40 at the insulation body 20.

The insulation body 20 has a rear portion of the base 21 thereof formed with three platforms extending upward in directions shown and having spaces in between. The platforms are a left platform 24, a right platform 25 and a middle platform 26. Between the left platform 24 and the middle platform 26, and between the right platform 25 and the middle platform 26, are respectively provided with a coaxial shaft 27. The two shafts 27 serve as fulcrums, which allow the movable cover 30 with lifting and closing movements as well as being capable of linearly moving with a small distance when closed.

An outer side of the left platform 24 is extended forward to form a tongue-plate 24a further having a rib 24b extended downward at a lower front portion thereof. Similarly to the outer side of the left platform 24, an outer side of the right platform 25 is also extended forward to form a tongue-plate 25b further having a rib 25b extended downward at a lower front portion thereof. However, in order to coordinate with the unsymmetrical structures at left and right sides of the mini SD card 60, the left and right sides of the movable cover 30 according to the invention are devised as unsymmetrical structures as well. Again, to coordinate with a structural design of the movable cover 30, a thickness of the tongue-plate 25a of the right platform 25 of the insulation body 20 according to the invention is larger than that of the tongue-plate 24a of the left platform 24 of the insulation body 20.

Figure 4:
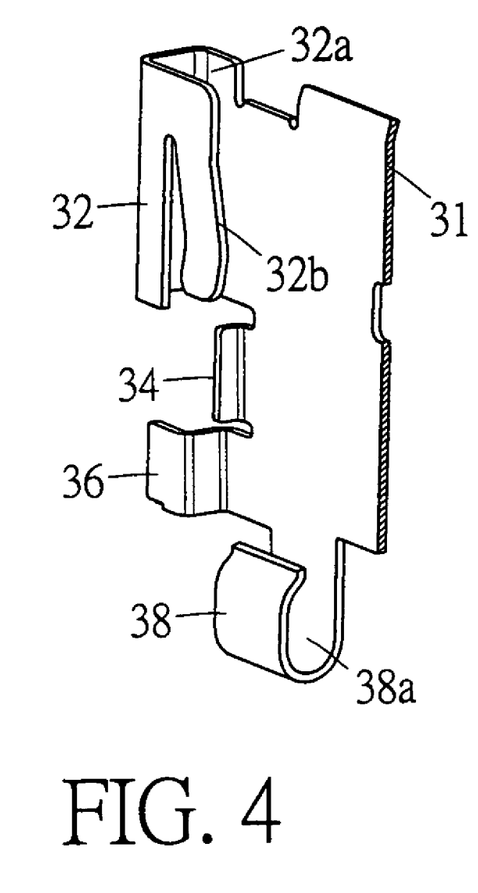
FIG. 4 shows a longitudinal sectional view of the movable cover 30 in FIG. 3. The movable cover 30 has a drawer space, and the right folded panel 32 has a pressing plate 32b slightly bent toward an internal space 32a of the right folded panel 32.

Referring to FIGS. 3 and 4, the movable cover 30 has a cover plate 31 respectively having an L-shaped folded panel at a front portion of each left and right sides thereof. That is, the left and right sides of the movable cover 30 has L-shaped left panel 33 and right folded panel 32. Horizontal sections of the left and right folded panels 33 and 32 are located facing toward an inner side of the movable cover 30, such that an internal space 32a of the right folded panel 32 and an internal space 33a of the left folded panel 33 together form a space having functions of a drawer for inserting and accommodating the mini SD card 60 therein. Meanwhile, a lower section of the right folded panel 32 or the left folded panel 33 is stamped to form a pressing plate 32b as indicated taking the right folded panel 32 as a an example. The pressing plate 32b is slightly bent upward toward the internal space 32a of the right folded panel 32 and is thus offered with elasticity. When the mini SD card 60 is placed into the movable cover 30, appropriate pressing force can be generated by the pressing plate 32b upon the mini SD card 60, such that a surface of the mini SD card 60 is levelly adhere to a surface of the covering plate 31 of the movable cover 30 to have the mini SD card 60 be smoothly inserted into the movable cover 30.

The covering plate 31 of the movable cover 30 further has a center portion at each two sides thereof extended downward to form a right block plate 34 and a left block plate 35. It is to be noted that, a position of the stamped right block plate 34 is a little deeper into the movable cover 30 compared to that of the left block plate 35 as indicated in FIG. 7 or FIG. 8.

To be more accurate, positions and heights of the right block plate 34 and the left block plate 35 are devised to coordinate with standard specifications of the mini SD card 60. Referring to FIG. 1, for that the mini SD card 60 is provided with a protective structure, and an upper edge of one of the guiding tracks 63 is formed with a wedge-shaped plane 62 having a notch, an unsymmetrical structure is developed.

Figure 6:
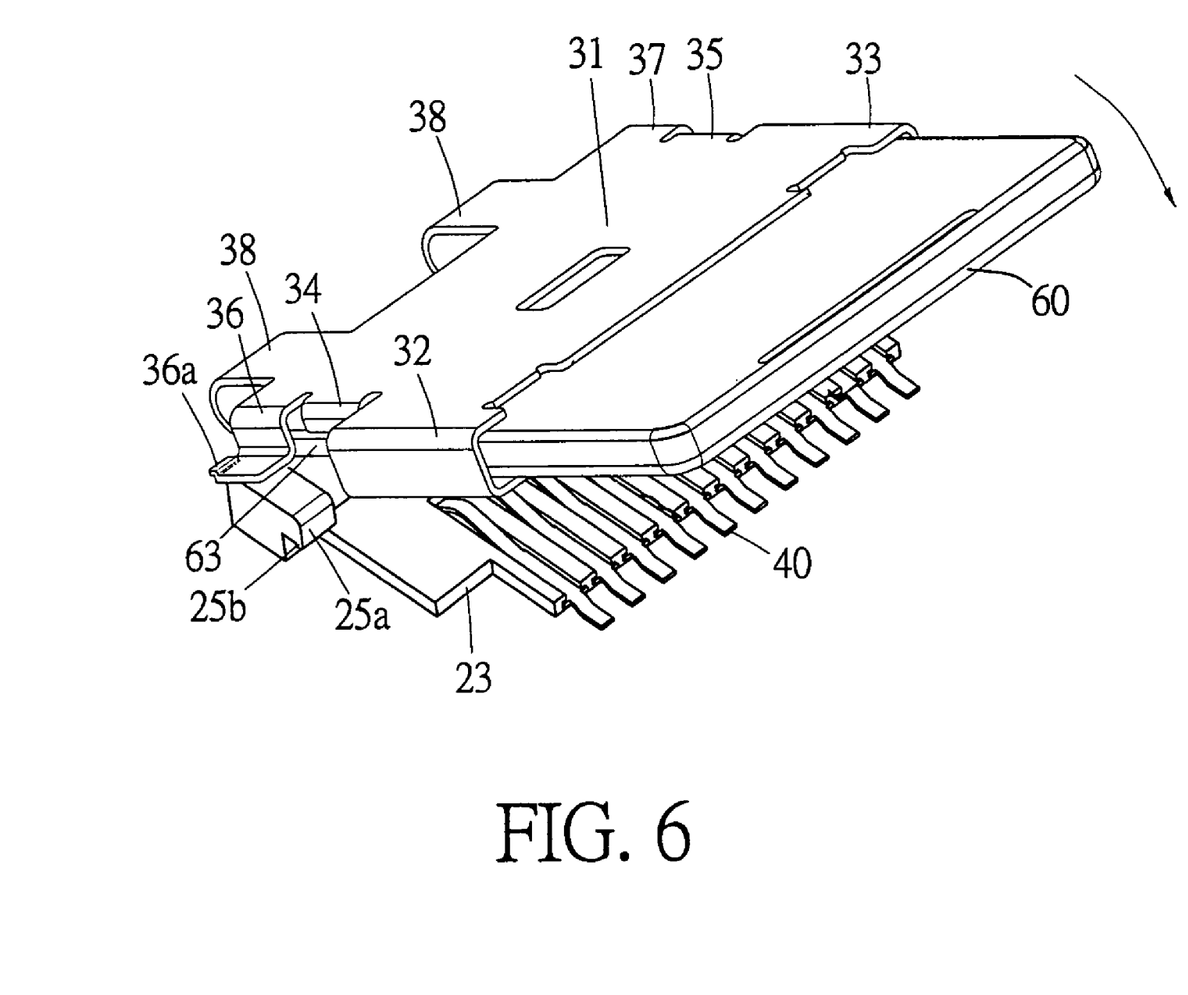
FIG. 6 shows a schematic view illustrating a process of the movable cover 30 in FIG. 5 being covered downward.
Figure 7:
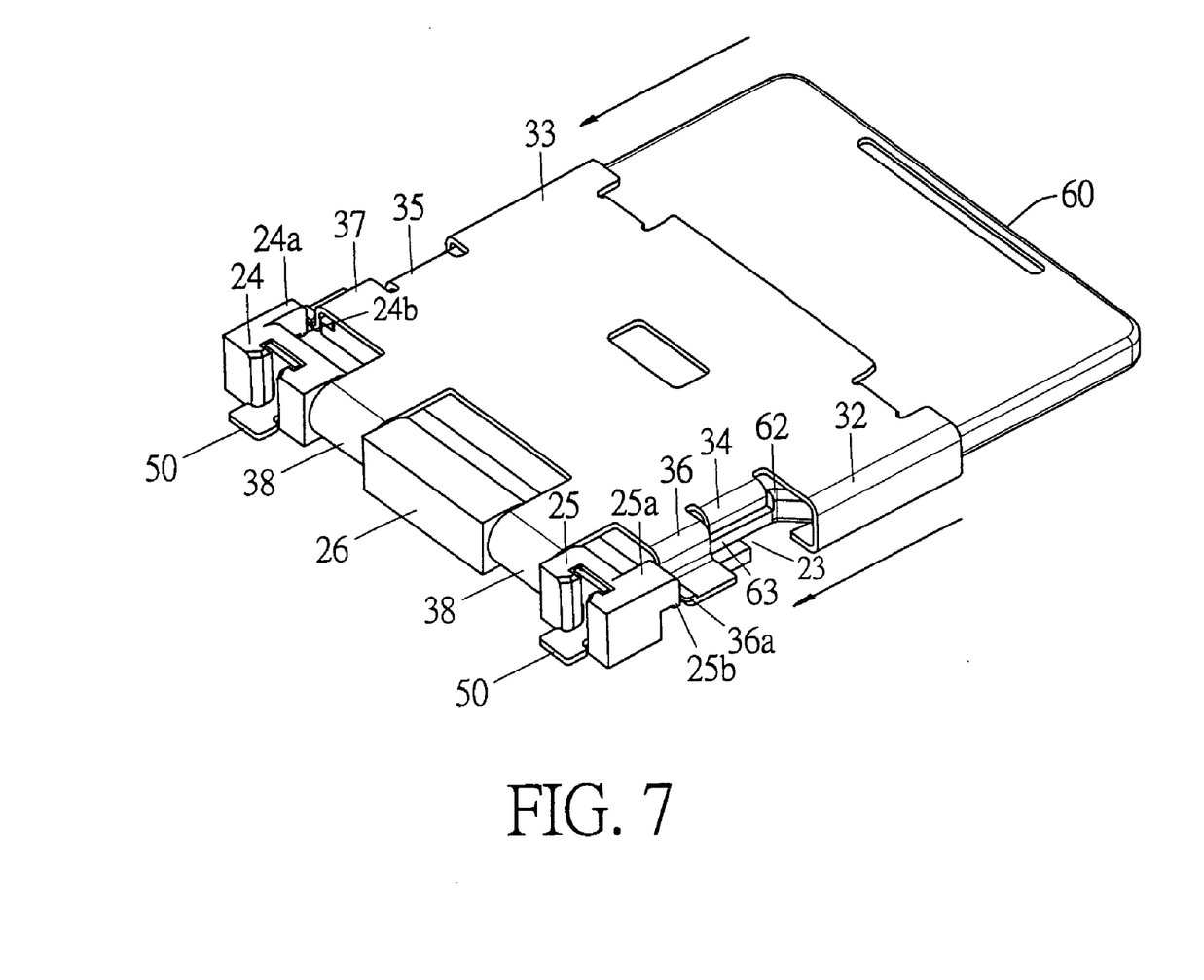
FIG. 7 shows a schematic view illustrating the movable cover 30 in FIG. 5 having completed covering downward and being ready to be pushed forward with the mini SD card 60, such that the movable cover 30 is located by the insulation body 20 for offering positioning effects.
Figure 8:
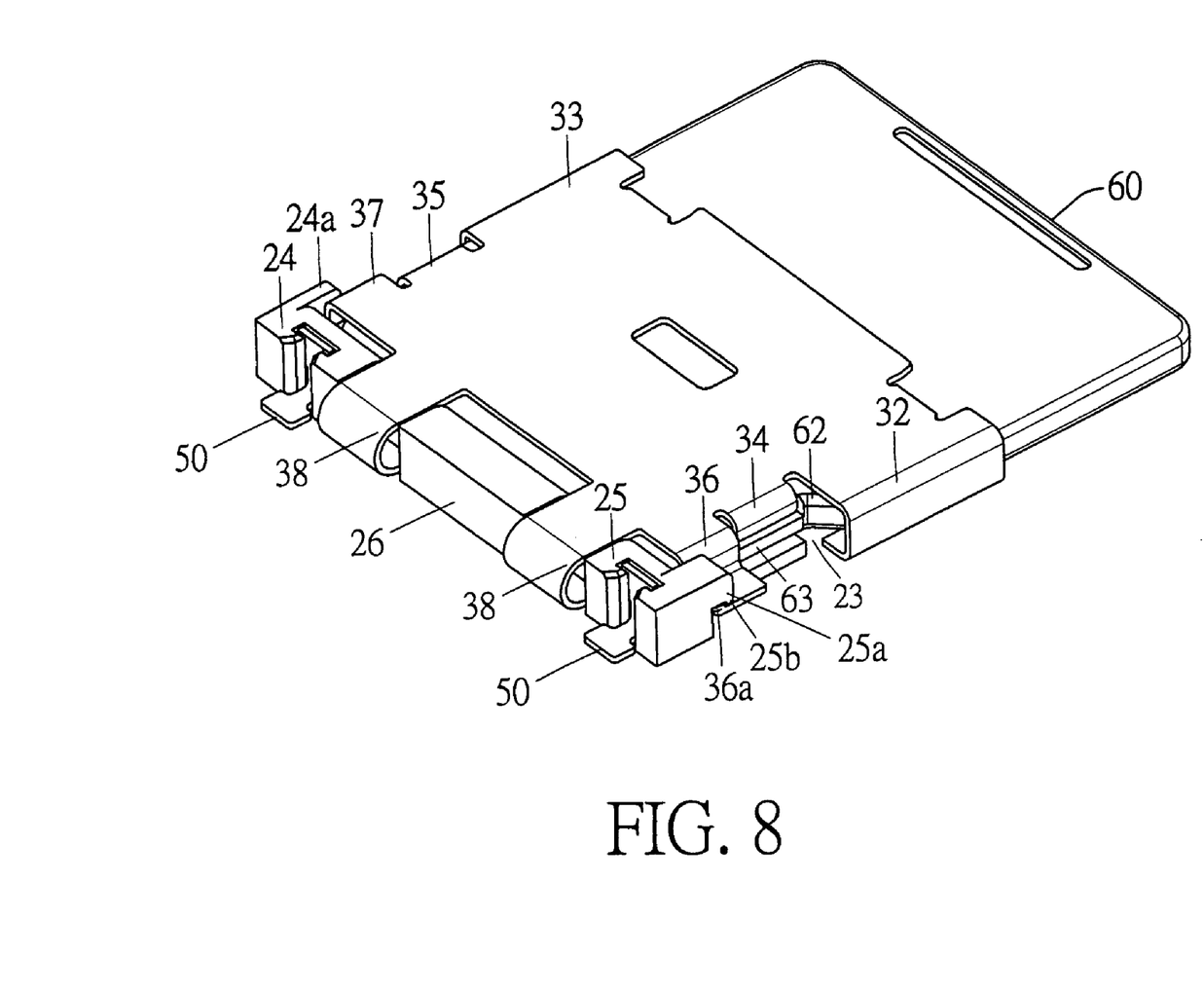
FIG. 8 shows a schematic view illustrating the movable cover 30 in FIG. 7 being located by the insulation body 20, and the signal contact portion 61 of the mini SD card 60 having formed electric connection with the mini SD card connector 10.

According to the aforesaid description, referring to FIGS. 6 to 8, when the mini SD card 60 is placed into the drawer space of the movable cover 30, the left and right block plates 35 and 34 of the movable cover 30 according to the invention are exactly located across and above the guiding track portions 63 of the mini SD card 60, so as to enable the mini SD card 60 to be correctly inserted into the movable cover 30. In addition, using the position of the right block plate 34 in conjunction with the protective structure of the mini SD card 60, a user is allowed to check whether the mini SD card 60 is placed appropriately. The principle behind is that, since the mini SD card 60 has the two sides thereof as unsymmetrical structures, supposed the mini SD card 60 is placed the other way round, a front portion of the signal contact portion 61 comes into contact with the right block plate 34 when the mini SD card 60 is placed into the drawer space of the movable cover and cannot be further moved therein. Vice versa, when being correctly inserted into the drawer space of the movable cover 30, the mini SD card 60 is guided by the left and right block plates 35 and 34 of the movable cover 30, and is continuously forwarded into the movable cover 30 till the right block plate 34 reaches the wedge-shaped plane 62 of the mini SD card 60. At this point, it is indicated that the mini SD card is correctly placed to a located position.

In order to have the shafts 27 of the insulation body 30 to serve as an axis relative to the movable cover 30, the shafts 27 are capable of linearly moving back-and-forth with a small distance apart from lifting and closing movements. A lower portion of the covering plate 31 of the movable cover 30 is devised with two extended loop lugs 38 for corresponding with the two shafts 27 of the insulation body 20. Referring to FIG. 3, each of the lugs 38 has a loop opening 38a consisted of an arc portion and linear portions. When the arc portions of the lugs 38a of the movable cover 30 come into contact with the shafts 27 of the insulation body 20, the movable cover 30 is enabled with 180° rotating movements, so as to be further lifted or closed and to allow the mini SD card 60 to be inserted at any desired angle. Moreover, the linear portions of the lugs 38 form tracks that provide the movable cover 30 for linear movements.

Figure 5:
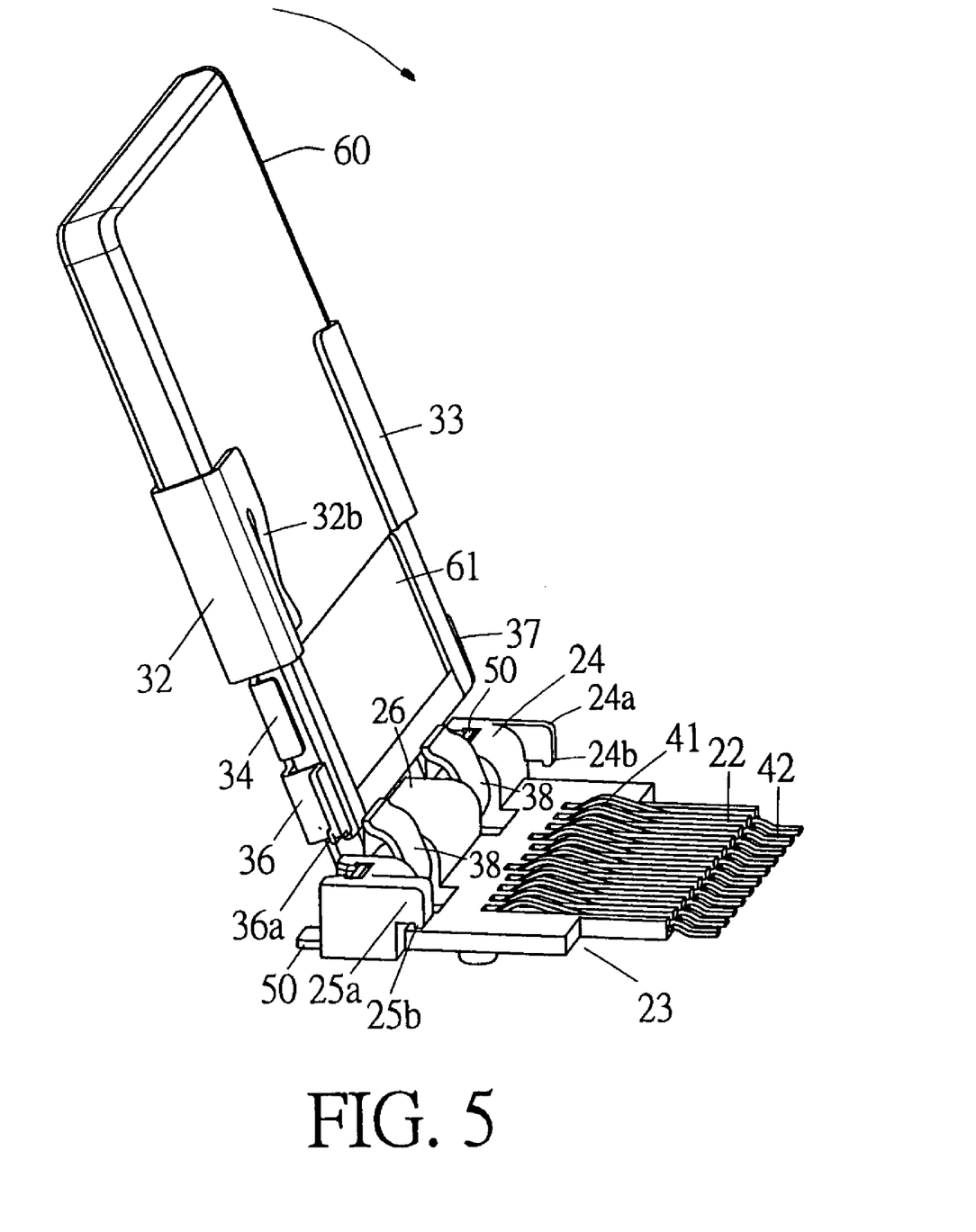
FIG. 5 shows a schematic view illustrating a status of the mini SD card 60 being correctly placed into the movable cover 30 and ready to be covered downward.

Referring to FIGS. 5 to 7, when the movable cover 30 is inserted into the mini SD card 60 and together closed in a downward direction, a reverse side of the signal contact portion 61 of the mini SD card 60 comes into contact with the insertion terminals 40 at the insulation body 20 to form good electric connection. To position the movable cover 30 at this moment, a rear portion of each left and right sides of the covering plate 31 of the movable cover 30 is extended downward to respectively form L-shaped left and right fastening plates 37 and 36. However, horizontal sections of the left and right fastening plates 37 and 36 are respectively faced toward an outer side of the movable cover 30, wherein a surface of each the horizontal sections is provided with a fastening rib 36a. Referring to FIGS. 7 and 8, the movable cover 30 and the mini SD card 60 are pushed forward after being covered in a downward direction, so that the fastening rib 36a at the right fastening plate 36 is embedded into the rib 24b at the left platform 24 of the insulation body 20. Thus, the movable cover 30 is not lifted for being retained by the left and right platforms 24 and 25, thereby forming good electric connection between the signal contact portion 61 of the mini SD card 60 and the insertion terminals 40 at the insulation body 20.

To withdraw the mini SD card 60, the aforesaid steps are performed in reverse. The movable cover 30 is pulled out along with the mini SD card 60, so as to disengage the movable cover 30 from the left and right platforms 24 and 25 of the insulation body 20. The mini SD card 60 is then lifted and withdrawn.

Referring to FIG. 3, on the left platform 25 of the insulation body 20 is an insertion slot 25c, and on the right platform 24 of the insulation body 20 is a similar insertion slot 24c. The insertion slots 25c and 24c are for placing a locking plate 50 therein. When putting the mini SD card connector 10 to use, the rear connecting sections 42 of the insertion terminals 40 may be soldered to a PCB to fasten the mini SD card connector 10.

Referring to FIGS. 5 to 8, the mini SD card connector 10 according to the invention is soldered to a PCB of a mobile phone, so that the mobile phone is capable of storing data using the mini SD card 60.

When in use, referring to FIG. 2, the movable cover 30 of the mini SD connector 10 is first lifted. At any desire angle, the mini SD card 60 is inserted into the drawer space in the movable cover 30 till the wedge-shaped plane 62 of the mini SD card 60 reaches the left block pate 34 of the movable cover 30. At this point, the movable cover 30 is covered in a downward direction, thereby forming electric contact between the signal contact portion 61 of the mini SD card 60 with the insertion terminals 40 at the insulation body 20.

The movable cover 30 is pushed forward along with the mini SD card 60, and then the left and right fastening plates 37 and 36 of the movable cover 30 become retained by the insulation body of the mini SD card connector 10 to position the movable cover 30, thereby forming good electric connection between the signal contact portion 61 of the mini SD card 60 and the insertion terminals 40 at the insulation body. Thus, the mobile phone is provided with multimedia functions including DSC, video capturing, MP3 playing and internet communication.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A lift-cover mini Secure Digital (SD) card connector comprising an insulation body, a movable cover and a plurality of insertion terminals; wherein:

the insulation body has a flat plate-like base, which is provided with channels at a surface thereof for insetting the insertion terminals, and three platforms upwardly extended with a shaft located in between at a rear portion thereof;

the movable cover includes a covering plate, which has left and right sides as unsymmetrical structures and a front section of each left and right sides respectively forming an L-shaped folded panel to form a drawer space of the covering plate; a center portion at each two sides of the covering plate is extended downward to form a block plate, with a position of one of the block plates being slightly deeper into the covering plate than that of the other; and the covering plate has two extended loop lugs for corresponding with the two shafts of the insulation body, with the loop lugs pivotally disposed at the shafts of the insulation body; and the plurality of insertion terminals is inset and located at the surface of the base of the insulation body, with a connecting section of each insertion terminal protruded to an exterior.

2. The mini SD card connector in accordance with claim 1, wherein each of the left and right platforms at two sides of the insulation body is extended forward to form a tongue-plate with a one having thickness different from that of the other, and each tongue-plate has a lower front portion thereof extended downward to form a rib; and a rear section of each left and right sides of the covering plate of the movable cover is extended downward to form an L-shaped fastening plate, horizontal sections of each fastening plates are respectively faced toward an outer side of the movable cover, and a surface of each the horizontal sections is provided with a fastening rib that form a fastening mechanism by corresponding with the ribs of the insulation body.

3. The mini SD card connector in accordance with claim 1, wherein the covering plate of the movable cover has L-shaped folded panels defining a drawer space, and pressing plates slightly bent and extended upward at the horizontal section thereof.

4. The mini SD card connector in accordance with claim 1, wherein a front section of each the left and right sides of the base of the insulation body is provided with an indenture.

5. The mini SD card connector in accordance with claim 1, wherein each of the left and right platforms at the two sides of the insulation body is provided with an insertion slot for placing a locking plate therein.

6. The mini SD card connector in accordance with claim 2, wherein the covering plate of the movable cover has L-shaped folded panels defining a drawer space, and pressing plates slightly bent and extended upward at the horizontal section thereof.

7. The mini SD card connector in accordance with claim 2, wherein a front section of each the left and right sides of the base of the insulation body is provided with an indenture.

8. The mini SD card connector in accordance with claim 3, wherein a front section of each the left and right sides of the base of the insulation body is provided with an indenture.

9. The mini SD card connector in accordance with claim 2, wherein each of the left and right platforms at the two sides of the insulation body is provided with an insertion slot for placing a locking plate therein.

* * * * *